United States Patent
Yokoyama et al.

(10) Patent No.: US 7,019,986 B2
(45) Date of Patent: Mar. 28, 2006

(54) POWER CONVERSION APPARATUS AND DEAD TIME GENERATOR

(75) Inventors: Kenji Yokoyama, Tokyo (JP); Yasuo Yamada, Hamamatsu (JP); Hiroshi Ogawa, Hamamatsu (JP)

(73) Assignee: Flying Mole Corporation, Hamamatsu (JP)

( * ) Notice: Subject to any disclaimer, the term of this patent is extended or adjusted under 35 U.S.C. 154(b) by 0 days.

(21) Appl. No.: 10/925,141

(22) Filed: Aug. 25, 2004

(65) Prior Publication Data

US 2005/0078490 A1    Apr. 14, 2005

(30) Foreign Application Priority Data

Aug. 28, 2003  (JP)  ............... 2003-305000

(51) Int. Cl.
*H02M 3/335*  (2006.01)

(52) U.S. Cl. ...................................... 363/16
(58) Field of Classification Search ............... 363/20, 363/21.01, 21.04, 21.12, 95, 97, 16, 24, 25
See application file for complete search history.

(56) References Cited

U.S. PATENT DOCUMENTS

| | | | |
|---|---|---|---|
| 4,523,268 A | 6/1985 | Brajder et al. | 363/98 |
| 6,262,618 B1 | 7/2001 | Maggiolino | 327/285 |
| 6,362,984 B1 * | 3/2002 | Gekinozu | 363/97 |
| 6,396,718 B1 * | 5/2002 | Ng et al. | 363/21.07 |
| 6,473,317 B1 * | 10/2002 | Simopoulos | 363/21.06 |
| 6,590,789 B1 * | 7/2003 | Bailly | 363/21.12 |
| 2002/0109471 A1 | 8/2002 | Adams et al. | |

FOREIGN PATENT DOCUMENTS

| | | |
|---|---|---|
| EP | 1 164 690 | 6/2001 |
| GB | 1 476 142 | 6/1977 |
| JP | 04-364362 | 12/1992 |

\* cited by examiner

*Primary Examiner*—Adolf Berhane
(74) *Attorney, Agent, or Firm*—Bacon & Thomas, PLLC

(57) ABSTRACT

A small-sized, highly efficient power conversion apparatus is provided which is capable of stabilizing its output and which can be easily applied to parallel driving. The power conversion apparatus turns on and off paired switching elements, lets an alternating current flow through a primary winding of a transformer, rectifies and smoothes an AC voltage thus induced across a secondary winding, thereby obtaining a DC output. On the basis of a rectangular wave signal having a duty ratio of 50% formed by a rectangular wave oscillator means, a dead time generator generates complementary on/off control signals having a dead time and supplies the on/off control signals to the paired switching elements.

14 Claims, 7 Drawing Sheets

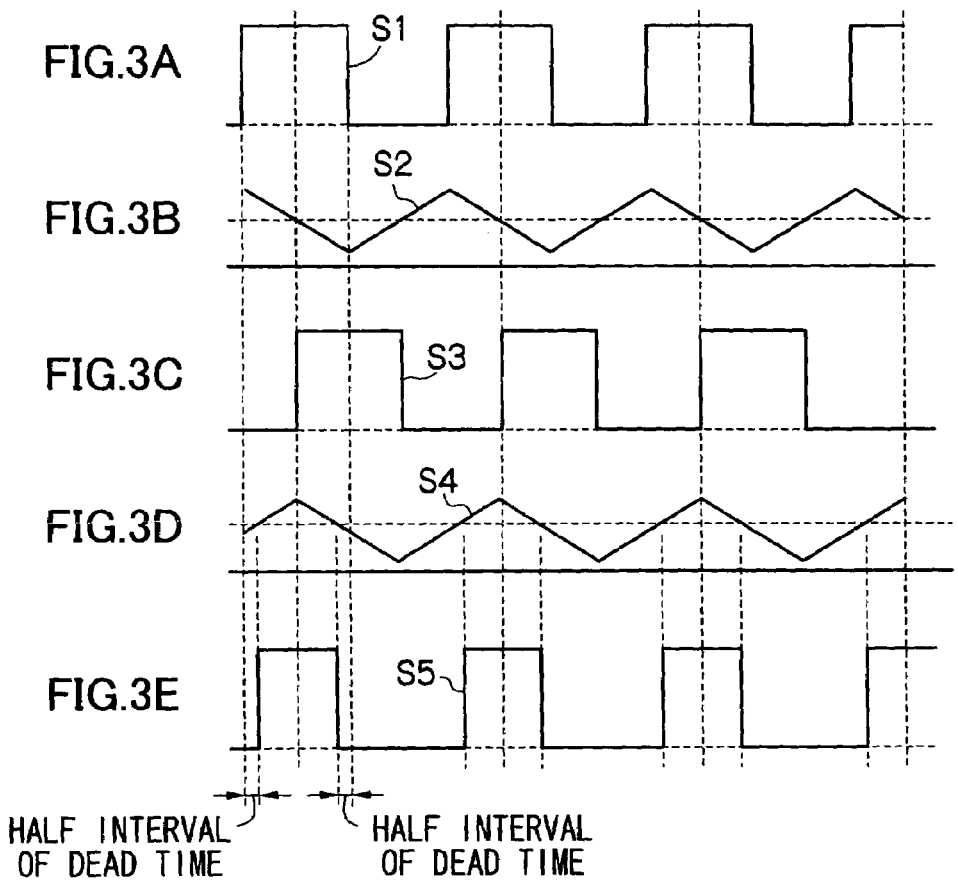
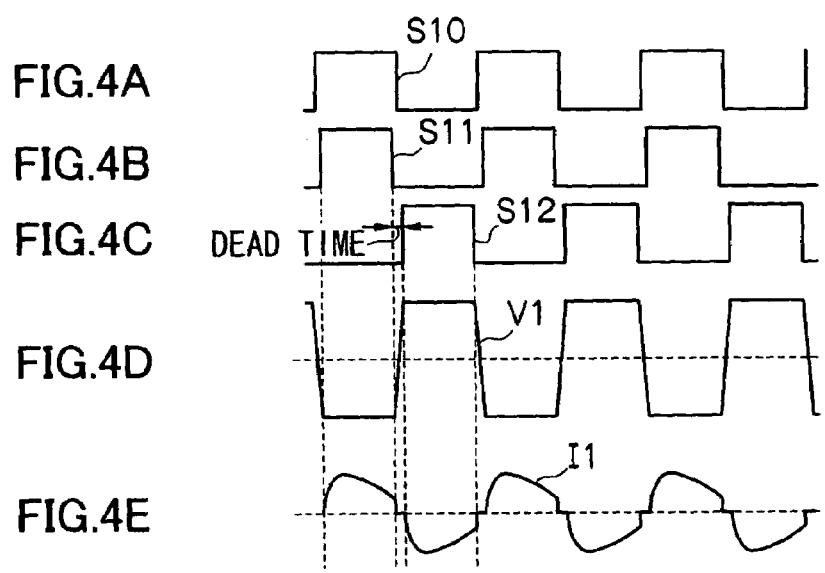

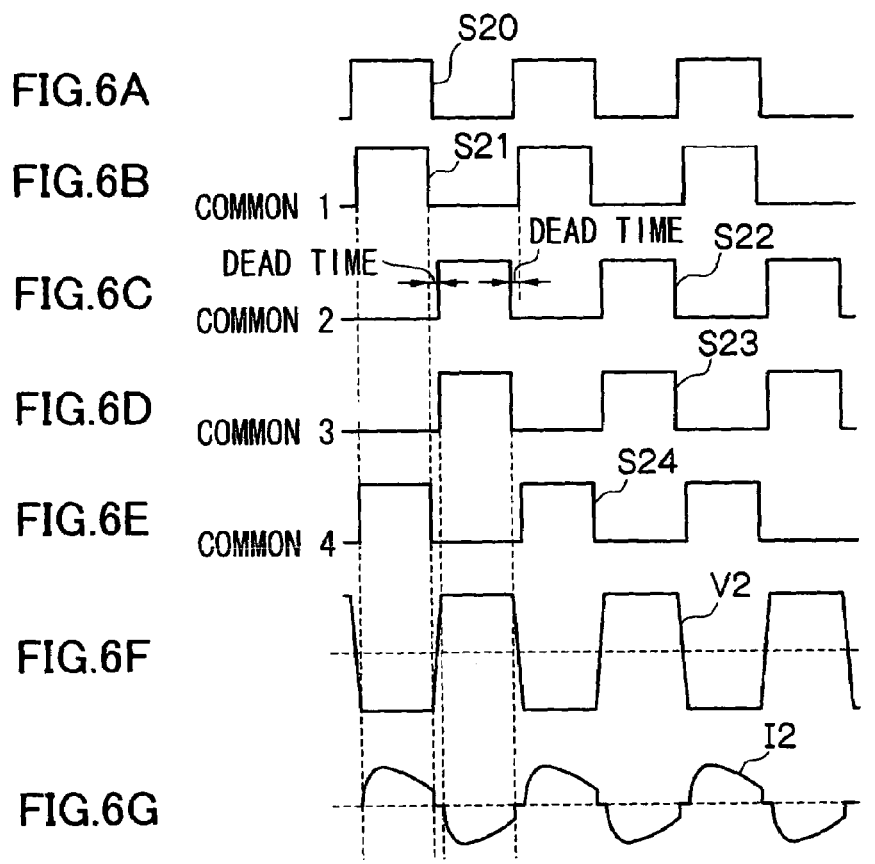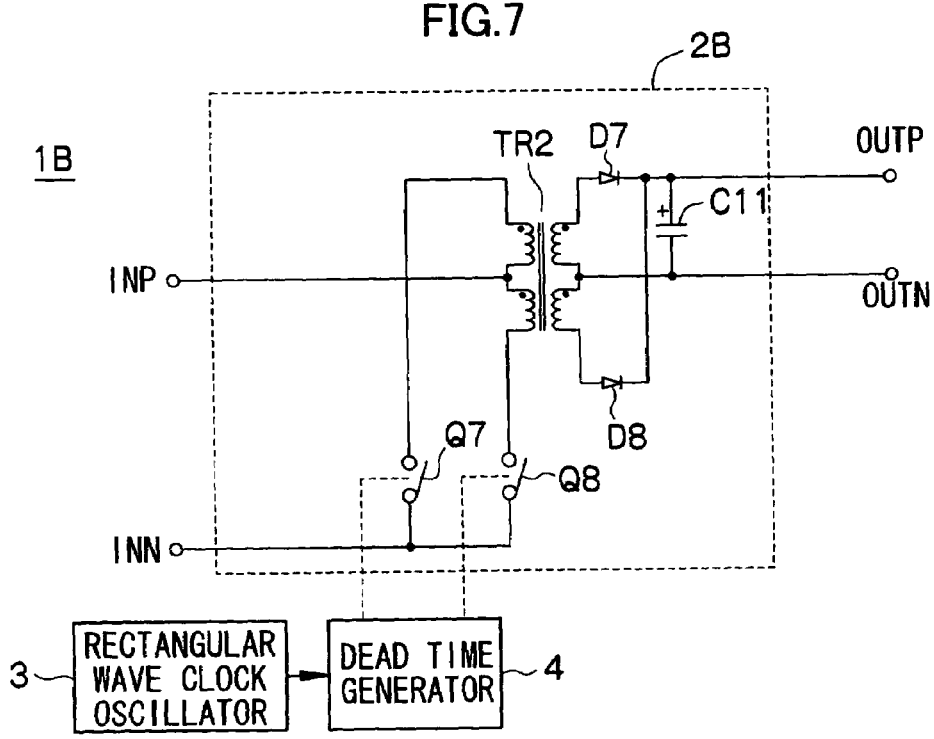

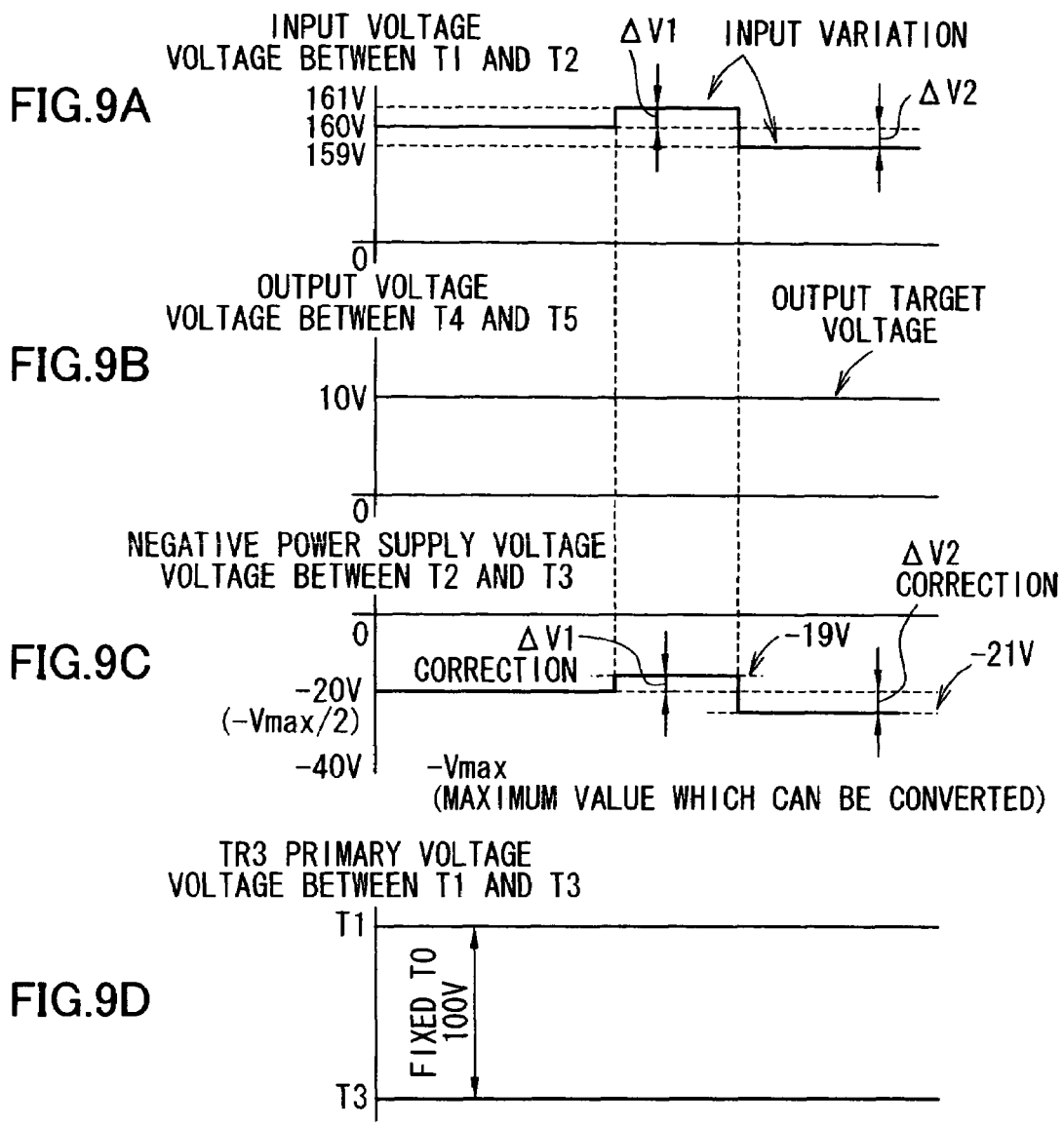
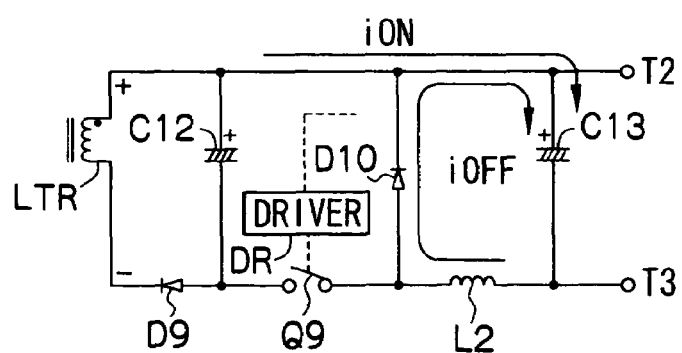

POWER CONVERSION APPARATUS AND DEAD TIME GENERATOR

CROSS-REFERENCE TO RELATED APPLICATION

This application claims, under 35 USC 119, priority of Japanese Application No. 2003-305000 filed Aug. 28, 2003.

BACKGROUND OF THE INVENTION

1. Field of the Invention

The present invention relates to a power conversion apparatus and a dead time generator. For example, the present invention can be applied to an apparatus using paired switching elements such as an AC-DC converter or DC-DC converter.

2. Description of the Related Art

As a power supply circuit (power conversion apparatus) for obtaining a DC output from the commercial power supply (AC input), there is one described in Japanese Patent Laid-Open No. 4-364362.

The power supply circuit described in Japanese Patent Laid-Open No. 4-364362 includes a DC power supply obtained from the commercial power supply (AC input) by conversion; switching means including a switching element, which can be controlled to turn on and off, to switch the DC power supply, convert the DC power supply to AC and output the AC; DC output means for conducting full-wave rectification on a supplied AC input, then conducting smoothing using a capacitor, and taking out a DC output; series resonance means formed in series between an output terminal of the switching means and an input terminal of the DC output means; parallel resonance means formed in parallel across the switching element in the switching means; and timing control means, which exercises control to periodically turn on and off the switching element in the switching means, after turning on the switching means, which exercises control to turns off the switching means after a current flowing through the switching means has become approximately zero due to end of series resonance in the series resonance means, after turning off the switching means, which exercises control to turns on the switching means after a voltage applied to the switching means has changed and become approximately zero due to parallel resonance in the parallel resonance means.

However, the above-described conventional circuit adopts self-excited zero-cross switching in which the switching means is switched after the voltage resonance and the current resonance have become approximately zero. Therefore, there is a problem that its general configuration becomes complicated and setting of characteristic values in respective elements is severe.

Furthermore, the zero-cross switching operation adopted by the conventional circuit has a problem in that it causes an increased peak current, a poor power factor, and a poor power conversion efficiency.

In addition, if a plurality of power supply circuits are operated in parallel and the conventional circuit is applied to each of the power supply circuits, there is a problem that the power supply circuits conduct switching operation independently and individually, and it is difficult to operate the power supply circuits in synchronism.

In addition, in the conventional circuit, the parallel resonance means is provided in parallel across the switching element in the switching means. Therefore, it is difficult to raise the frequency and size reduction of the whole configuration is obstructed.

SUMMARY OF THE INVENTION

The present invention has been achieved in order to solve the above-described problems. An object of the present invention is to provide a small-sized, highly efficient power conversion apparatus that is capable of stabilizing its output and that can be easily applied to parallel driving (synchronized operation).

Another object of the present invention is to provide a dead time generator suitable for application to such a power conversion apparatus.

A power conversion apparatus according to the present invention includes (A) switching means having one or more pairs of switching elements, (B) a transformer in which a current flowing through a primary winding thereof is alternated by turning on and off of the switching elements in the switching means, (C) rectifier means for rectifying a voltage induced across a secondary winding of the transformer, (D) smoothing means for smoothing a rectified output of the rectifier means, (E) rectangular wave oscillator means for generating a rectangular wave signal having a duty ratio of 50% by oscillation, and (F) a dead time generator for forming complementary on/off control signals having a dead time to be supplied to paired two switching elements, on the basis of the rectangular wave signal output from the rectangular wave oscillator means.

A dead time generator according to the present invention forms complementary on/off control signals having a dead time to be supplied to paired switching elements. The dead time generator includes (A) first triangular wave forming means for converting a first rectangular wave signal having a duty ratio of 50% input thereto to a first triangular wave forming signal having the same inclination in monotonous increase and monotonous decrease, (B) first comparator means for forming a second rectangular wave signal having a duty ratio of 50% shifted in phase from the first rectangular wave signal by $\pi/2$ (or $-\pi/2$) by comparing the first triangular wave signal with a first threshold level, (C) second triangular wave forming means for converting the second rectangular wave signal to a second triangular wave forming signal having the same inclination in monotonous increase and monotonous decrease, (D) second comparator means for forming a third rectangular wave signal having a duty ratio greater than 50% by a value corresponding to the dead time, shifted in phase from the second rectangular wave signal by $\pi/2$ (or $-\pi/2$) by comparing the second triangular wave signal with a second threshold level, and (E) inverter means for inverting and outputting the third rectangular wave signal, and thereby outputting an on/off control signal having the same phase as that of the first rectangular wave signal and having a dead time interval.

According to the power conversion apparatus of the present invention, the complementary on/off control signals having a dead time to be supplied to the paired switching elements are generated on the basis of the rectangular wave signal generated by oscillation in the rectangular wave oscillation means. The switching means is controlled by the complementary on/off control signals. Therefore, a small-sized, highly efficient apparatus that is capable of stabilizing its output and that can be easily applied to parallel driving (synchronized operation) can be implemented.

According to a dead time generator of the present invention, on/off control signals having a dead time synchronized to a rectangular wave signal having a duty ratio of 50% input thereto can be formed. The dead time generator is suitable for application to an apparatus having a configuration for generating on/off control signals to be supplied to the paired switching elements.

BRIEF DESCRIPTION OF THE DRAWINGS

FIG. 3 is a diagram showing signals at various points in a dead time generator according to the first embodiment of the invention;

FIG. 4 is a diagram showing signals at various points in a power conversion apparatus according to the first embodiment of the invention;

FIG. 6 is a diagram showing signals at various points in a power conversion apparatus according to the second embodiment of the invention;

FIG. 7 is a circuit diagram showing a general configuration of a power conversion apparatus according to a third embodiment of the invention;

FIG. 9 is a signal waveform diagram showing an operation concept of output voltage stabilization in a power conversion apparatus according to the fourth embodiment of the invention;

FIG. 10 is a diagram showing operation of an output voltage stabilization circuit according to the fourth embodiment of the invention.

DESCRIPTION OF THE PREFERRED EMBODIMENTS

Preferred embodiments of a power conversion apparatus and a dead time generator according to the present invention will now be described below.

(A) First Embodiment

Figure 1:
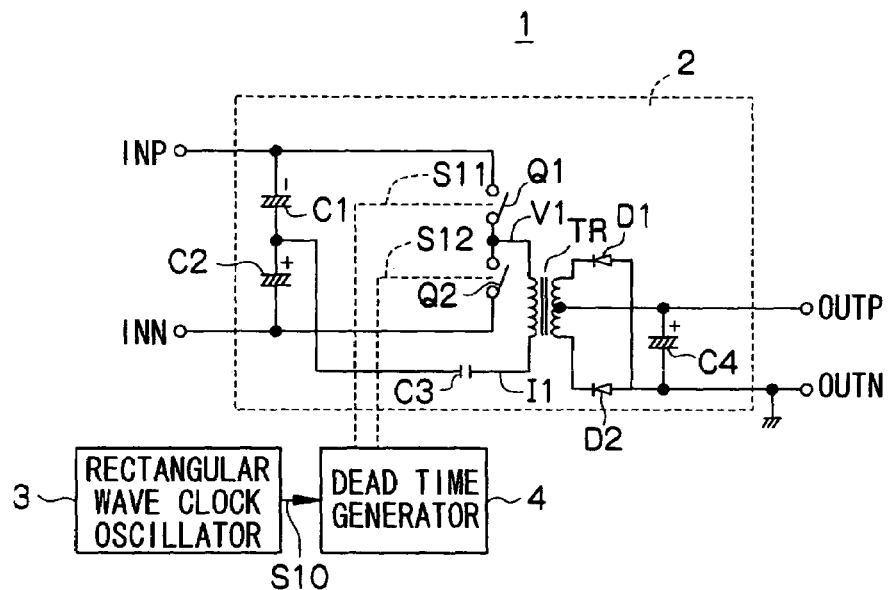
FIG. 1 is a circuit diagram showing a general configuration of a power conversion apparatus according to a first embodiment of the present invention.

FIG. 1 is a circuit diagram showing a general configuration of a first embodiment of a power conversion apparatus according to the present invention. Incidentally, the power conversion apparatus in the first embodiment is DC in its input and output. In other words, the power conversion apparatus in the first embodiment is a DC-DC converter for converting a DC voltage to another DC voltage.

In FIG. 1, a power conversion apparatus (DC-DC converter) 1 in the first embodiment includes a DC-DC conversion section 2, a rectangular wave clock oscillator 3, and a dead time generator 4.

The DC-DC conversion section 2 includes switching elements Q1 and Q2, capacitors C1 to C4, a transformer TR, and diodes D1 and D2.

The switching elements Q1 and Q2 are, for example, MOS transistors. The switching elements Q1 and Q2 are connected in series between DC input terminals INP and INN. In response to on/off control signals from the dead time generator 4, the switching elements Q1 and Q2 conduct complementary on/off operations except at the dead time. The capacitors C1 and C2 are also connected in series between the DC input terminals INP and INN. One terminal of a primary winding of the transformer TR is connected to a node between the switching elements Q1 and Q2. The other terminal of the primary winding of the transformer TR is connected to a node between the capacitors C1 and C2 via a capacitor C3.

A secondary winding of the transformer TR has a center tap. The center tap is connected to a DC output terminal OUTP of high potential side. A DC output terminal OUTN of low potential side is connected both terminals of the secondary winding of the transformer TR via anodes and cathodes of the diodes D1 and D2. A smoothing capacitor C4 is connected between the output terminals OUTP and OUTN.

Although description of the internal configuration of the rectangular wave clock oscillator 3 will be omitted, the rectangular wave clock oscillator 3 generates a rectangular wave clock having a predetermined frequency and a duty ratio of 50%. The rectangular wave clock oscillator 3 may generate a pair of rectangular wave clocks that are complementary to each other. The rectangular wave clock oscillator 3 may generate a rectangular wave clock of one kind and the dead time generator 4 may form a pair of rectangular wave clocks that are complementary to each other.

If there are a plurality of DC-DC conversion sections 2, the rectangular wave clock oscillator 3 is shared by the DC-DC conversion sections 2 to make possible synchronous operation (parallel driving) of the DC-DC conversion sections 2.

The dead time generator 4 forms complementary on/off control signals to be supplied to the switching elements Q1 and Q2, on the basis of the rectangular wave clock output from the rectangular wave clock oscillator 3, and drives the switching elements Q1 and Q2. In the on/off control signals, very short dead time is provided during which both the switching elements Q1 and Q2 are turned off.

Figure 2:
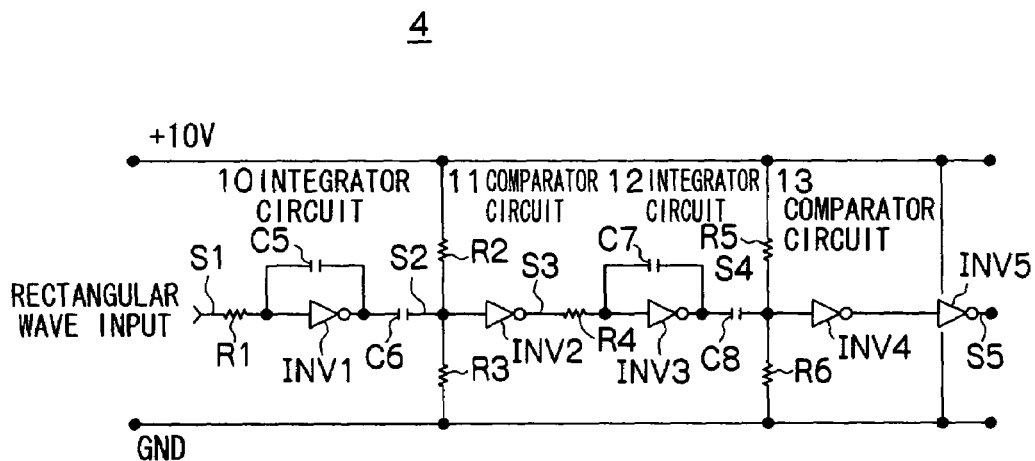
FIG. 2 is a circuit diagram showing an internal configuration example of a dead time generator according to the first embodiment of the invention.

FIG. 2 is a circuit diagram showing a principal part configuration example of the dead time generator 4 (an embodiment of the dead time generator). The dead time generator 4 shown in FIG. 2 forms an on/off control signal synchronized to an input rectangular wave clock. Incidentally, FIG. 2 shows a configuration for forming one of the on/off control signals, and a configuration for driving the switching elements Q1 and Q2 is omitted.

With reference to FIG. 2, the dead time generator 4 includes a cascade connection of an integrator circuit (triangular wave forming circuit) 10, a coupling capacitor C6, a comparator circuit 11, an integrator circuit (triangular wave forming circuit) 12, a coupling capacitor C8, a comparator circuit 13, and an inverter INV5.

The integrator circuit (triangular wave forming circuit) 10 located at a first stage includes a resistor R1 connected in series with a parallel circuit of a capacitor C5 and an inverter INV1. The integrator circuit 10 forms and outputs a triangular wave signal. The triangular wave signal monotonously decreases with a predetermined inclination while the input rectangular wave clock assumes one of logic levels ("H" in FIG. 2). The triangular wave signal monotonously increases with the same inclination as the above-described inclination while the input rectangular wave clock assumes the other of logic levels ("L" in FIG. 2).

The coupling capacitor C6 extracts only an AC component of the triangular wave signal output from the integrator circuit 10 (removes a DC component), and supplies the AC component to the comparator circuit 11.

The comparator circuit 11 includes voltage divider resistors R2 and R3 connected in series between high and low power supply lines, and an inverter INV2. The voltage divider resistors R2 and R3 function to provide the triangular wave signal supplied from the coupling capacitor C6 with a DC potential (function to adjust the center level). The inverter INV2 functions to convert the triangular wave signal adjusted in DC potential to a rectangular wave signal by using a threshold level to determine whether to take in the input of the inverter INV2 as an H level or an L level. The inverter INV2 outputs a rectangular wave signal, which assumes an L level for a level of the input rectangular wave signal that can be handled as an H level and assumes an H level for a level of the input rectangular wave signal that can be handled as an L level. Values of the voltage divider resistors R2 and R3 are selected to provide a DC potential so as to make the duty ratio of the rectangular wave signal supplied from the inverter INV2 equal to 50%.

The integrator circuit 10, the coupling capacitor C6 and the comparator circuit 11 function to delay the phase of a rectangular wave clock supplied to the dead time generator 4 by $\pi/2$ (see FIG. 4 described later).

The integrator circuit (triangular wave forming circuit) 12 also has a configuration similar to that of the integrator circuit 10 described above. The integrator circuit (triangular wave forming circuit) 12 also functions to convert the rectangular wave signal supplied from the comparator circuit 11 to a triangular wave signal. The coupling capacitor C8 also functions to remove a DC component from the triangular wave signal supplied from the integrator circuit 12 in the same way as the above-described coupling capacitor C6.

The comparator circuit 13 supplied with the triangular wave signal via the coupling capacitor C8 also has a configuration similar to that of the above-described comparator circuit 11, and converts the triangular wave signal input thereto to a rectangular wave signal. However, values of divider resistors R5 and R6 in the comparator circuit 13 are determined considering the dead time interval. The rectangular wave signal output from the comparator circuit 13 is set so as to make the H level interval longer than the L level interval by the dead time interval. As compared with the rectangular wave clock input to the dead time generator 4, the rectangular wave signal output from the comparator circuit 13 is shifted in phase by $\pi$.

The inverter INV5 in the final stage inverts the logical level of the rectangular wave signal supplied from the comparator circuit 13, converts the rectangular wave signal supplied from the comparator circuit 13 to a rectangular wave signal having an L level interval longer than an H level interval by the dead time interval, and supplies the rectangular wave signal to a corresponding switching element (not illustrated) as an on/off control signal. The rectangular wave signal (on/off control signal) output from the inverter INV5 is synchronized in the same phase to the rectangular wave clock input to the dead time generator 4.

Operation of the power conversion apparatus (DC-DC converter) 1 in the first embodiment will now be described with reference to signal waveform diagrams shown in FIGS. 3 and 4.

For example, when the conversion operation of the power conversion apparatus 1 becomes necessary, the user orders the operation start by using a button or the like, which is not illustrated. As a result, the rectangular wave clock oscillator 3 outputs a rectangular wave clock generated by oscillation.

If complementary rectangular wave clocks are input (if a rectangular wave clock of one kind is input, the other rectangular wave clock is also formed), then the dead time generator 4 forms complementary on/off control signals having the dead time and supplies them to the pair of switching elements Q1 and Q2.

If a rectangular wave clock S1 as shown in FIG. 3A is input to the dead time generator 4, then the integrator circuit (triangular wave forming circuit) 10 converts the rectangular wave clock S1 to a triangular wave signal S2 as shown in FIG. 3B, and the coupling capacitor C6 removes a DC component. The comparator circuit 11 converts the triangular wave signal with the DC component removed to a rectangular wave signal S3 having a duty ratio of 50% as shown in FIG. 3C. The integrator circuit (triangular wave forming circuit) 12 converts the rectangular wave signal S3 to a triangular wave signal S4 as shown in FIG. 3D. The coupling capacitor C8 removes a DC component. Subsequently, the comparator circuit 12 converts the triangular wave signal with the DC component removed to a rectangular wave signal. When converting the triangular wave signal to the rectangular wave signal in the comparator circuit 12, a rectangular wave signal having an H level interval longer than the dead time interval is obtained by selecting a reference level. The inverter INV5 inverts the logic level of the rectangular wave signal. As a result, an on/off control signal S5, which is synchronized to the input rectangular wave clock and which has the same phase as that of the input rectangular wave clock as shown in FIG. 3E, is formed.

A DC voltage is input from the DC input terminals INP and INN to the DC-DC conversion section 2. On/off control signals S11 and S12 as shown in FIGS. 4B and 4C are input from the dead time generator 4 to the switching elements Q1 and Q2 in the DC-DC conversion section 2. FIG. 4A shows a rectangular wave clock S10, on the basis of which the on/off control signals S11 and S12 have been formed.

The DC voltage (DC input) supplied to the DC-DC conversion section 2 may be, for example, input from a DC power source such as a battery, or maybe input from an apparatus that converts the commercial AC power source to a DC power supply.

When the switching element Q1 is on and the switching element Q2 is off in the DC-DC conversion section 2 under the control of the pair of on/off control signals having dead time, a current path is formed from the DC input terminal INP to the DC input terminal INN via the switching element Q1, the primary winding of the transformer TR, the capacitor C3 and the capacitor C2. On the contrary, when the switching element Q1 is off and the switching element Q2 is on under the control of the pair of on/off control signals having dead time, a current path is formed from the DC input terminal INN to the DC input terminal INP via the capacitor C2, the capacitor C3, the primary winding of the transformer TR, and the switching element Q1. When both the switching elements Q1 and Q2 are off under the control of the pair of on/off control signals having dead time, a current path is not formed.

As a result of such switching operation, a current I1 as shown in FIG. 4E flows through the primary winding of the transformer TR. Therefore, an alternating field is excited in the transformer TR.

FIG. 4D shows a potential V1 at a node between the switching elements Q1 and Q2, resulting in an AC voltage.

The potential V1 shown in FIG. 4D becomes a composite potential of a potential caused by turning on/off of the switching element Q1 and a potential caused by turning on/off of the switching element Q2. The dead time interval is set equal to time required for a change between a high potential and a low potential when one switching element Q1 (or Q2) changes from on to off or from off to on.

Since MOS transistors are used as the switching elements Q1 and Q2, the voltage resonance function is fulfilled by internal capacitances of the switching elements Q1 and Q2 in the off-state and inductance of the primary side of the transformer TR. Furthermore, the current resonance function is also fulfilled by leak inductance of the transformer TR and the capacitance of the capacitor C3.

An alternating voltage (AC voltage) is induced across the secondary winding of the transformer TR by the alternating field. If a voltage from the bottom side shown in FIG. 1 to the top side is induced across the secondary winding of the transformer TR, then a current path is formed from one terminal (a terminal on the ground side) of the capacitor C4 to the other terminal of the capacitor C4 via the diode D2 and the secondary winding (between a bottom tap and the center tap) of the transformer TR. As a result, charging operation is conducted on the smoothing capacitor C4. On the contrary, if a voltage from the top side shown in FIG. 1 to the bottom side is induced across the secondary winding of the transformer TR, then a current path is formed from one terminal (the terminal on the ground side) of the capacitor C4 to the other terminal of the capacitor C4 via the diode D1 and the secondary winding (between a top tap and the center tap) of the transformer TR. As a result, charging operation is conducted on the smoothing capacitor C4. As heretofore described, smoothed voltage obtained across the smoothing capacitor C4 is output from the DC output terminals OUTP and OUTN.

The power conversion apparatus and the dead time generator according to the first embodiment can achieve the effects given below.

According to the power conversion apparatus in the first embodiment, one pair of switching elements are subject to on/off control including the dead time control. Therefore, it is possible to execute switching stably, without being affected by operation of the other switching element at the time of transition from the off-state to the on-state, while suppressing the overshoot variation. Furthermore, since no current flows over the dead time interval, the loss over this interval can be eliminated.

The voltage resonance function and the current resonance function are fulfilled by internal capacitance included in MOS transistors forming switching elements. From this aspect, therefore, power can be converted efficiently.

Since the on/off control signal supplied to the switching element is formed without monitoring voltage or current zero-crossing in a predetermined position, the general configuration is simple. In the zero-crossing system, the peak current becomes great, resulting in a poor power factor and a poor conversion efficiency. In the first embodiment, however, such drawbacks do not occur.

The dead time generator in the first embodiment forms the on/off control signal synchronized in the same phase or opposite phase to the rectangular wave clock. Even if a plurality of DC/DC conversion sections are present, therefore, synchronous operation of the DC/DC conversion sections can be implemented.

According to the dead time generator in the first embodiment, the on/off control signal having half of a dead time interval before and after it can be formed with respect to the input rectangular wave clock, and synchronism with the rectangular wave clock is very favorable. Although intervals each equivalent to half of the dead time interval are provided with respect to the rectangular wave clock, the desired dead time interval can be implemented with respect to the other on/off control signal paired therewith.

Incidentally, in many of conventional dead time generators, a dead time interval is provided on one of the positive edge side or the falling edge side of the rectangular wave clock. Although the on/off control signal is synchronized to the input rectangular wave clock, the on/off control signal is not in the same phase relation to the input rectangular wave clock.

(B) Second Embodiment

Figure 5:
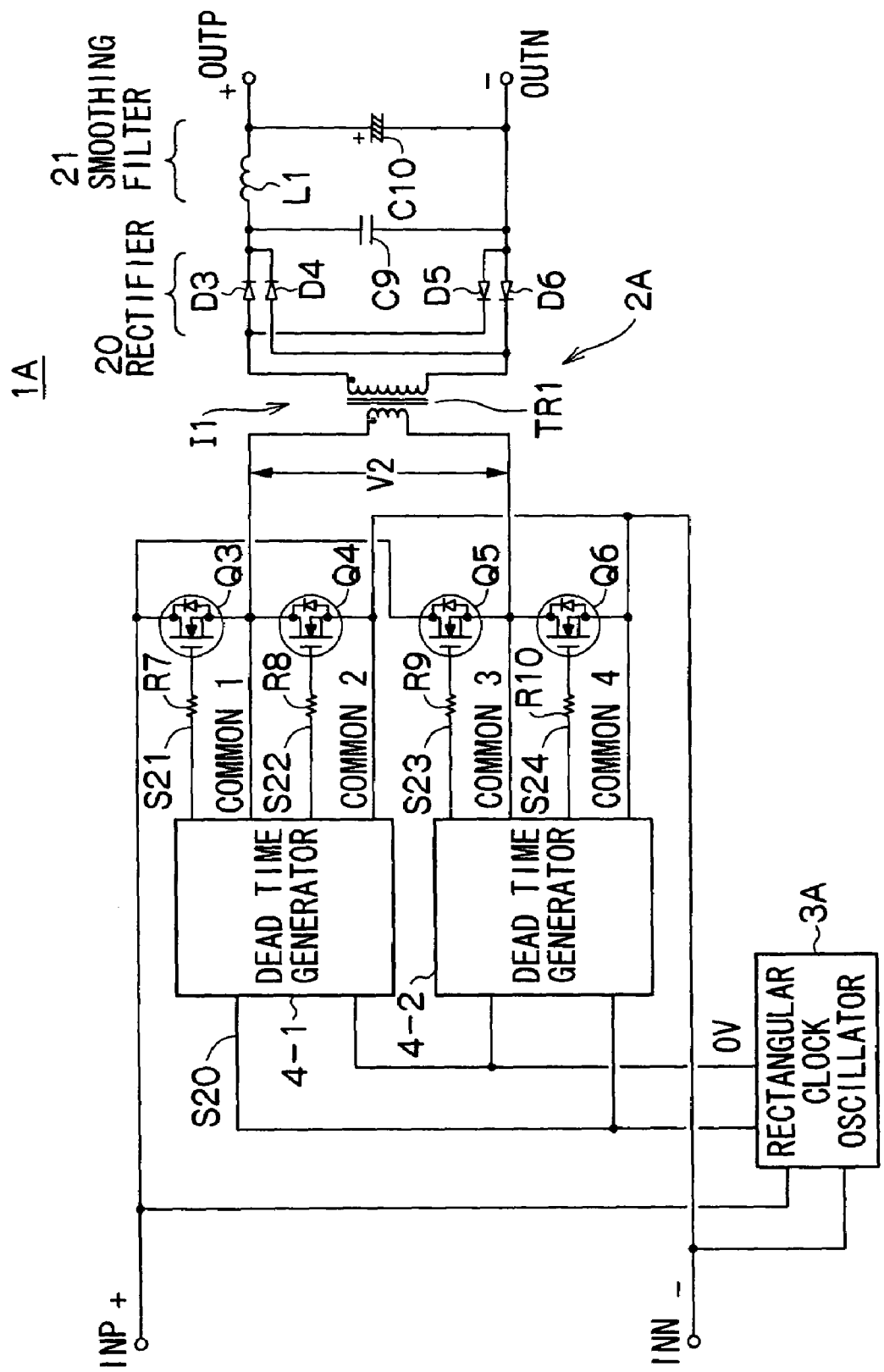
FIG. 5 is a circuit diagram showing a general configuration of a power conversion apparatus according to a second embodiment of the invention.

FIG. 5 is a circuit diagram showing a general configuration of a second embodiment of a power conversion apparatus according to the present invention. The same components as or corresponding to those shown in FIG. 1 according to the first embodiment are denoted by like characters. Incidentally, the power conversion apparatus in the second embodiment is also DC in input and output. In other words, the power conversion apparatus is a DC-DC converter for converting a DC voltage to another DC voltage.

With reference to FIG. 5, the power conversion apparatus (DC-DC converter) 1A in the second embodiment includes a DC-DC conversion section 2A, a rectangular wave clock oscillator 3A, and two dead time generators 4-1 and 4-2.

The DC-DC conversion section 2A includes two pairs of switching elements Q3 and Q4, and Q5 and Q6, four gate resistors R7 to R10, a transformer TR1, a rectifier 20, a current resonance capacitor C9, and a smoothing filter 21.

In the same way as the rectangular wave clock oscillator 3 in the first embodiment, the rectangular wave clock oscillator 3A generates a rectangular wave clock S20 having a predetermined frequency and a duty ratio of 50% by oscillation, and supplies the rectangular wave clock S20 to the dead time generators 4-1 and 4-2. Although omitted in the description of the first embodiment, the rectangular wave clock oscillator 3A supplies a reference potential (for example, 0 V) to the dead time generators 4-1 and 4-2.

Each of the dead time generators 4-1 and 4-2 includes the principal part configuration as shown in FIG. 2. The dead time generators 4-1 and 4-2 form a pair of complementary on/off control signals S21 and S22, and S23 and S24 having a dead time, respectively. The dead time generator 4-1 also outputs a common (level) 1 prescribing an L level of the on/off control signal S21 and a common (level) 2 prescribing an L level of the on/off control signal S22. The dead time generator 4-2 also outputs a common (level) 3 prescribing an L level of the on/off control signal S23 and a common (level) 4 prescribing an L level of the on/off control signal S24.

Each of a total of four switching elements Q3 to Q6 is a MOS transistor such as a power MOS or a MOS-FET. One pair of switching elements Q3 and Q4 are connected in series between DC input terminals INP and INN. The other pair of switching elements Q5 and Q6 are also connected in series between DC input terminals INP and INN.

The on/off control signal S21 from the dead time generator 4-1 is supplied to the switching element Q3 at its gate via a gate resistor R7. The on/off control signal S22 from the dead time generator 4-1 is supplied to the switching element Q4 at its gate via a gate resistor R8. A level at a node between the switching elements Q3 and Q4 is set equal to the common 1. A level at a drain terminal of the switching element Q4 is set equal to the common 2.

The on/off control signal S23 from the dead time generator 4-2 is supplied to the switching element Q5 at its gate via a gate resistor R9. The on/off control signal S24 from the dead time generator 4-2 is supplied to the switching element Q6 at its gate via a gate resistor R10. A level at a node between the switching elements Q5 and Q6 is set equal to the common 3. A level at a drain terminal of the switching element Q6 is set equal to the common 4.

Incidentally, the on/off control signals S21 and S24 have similar waveforms, and the on/off control signals S22 and S23 have similar waveforms. Since the common levels are different, however, two generators 4-1 and 4-2 are provided as the dead time generators. Here, the dead time generators 4-1 and 4-2 have the principal part configuration shown in FIG. 2 and the dead time generators 4-1 and 4-2 can form the on/off control signals S21 to S24 completely synchronized to the rectangular wave clock S20. Therefore, adverse effects are not caused by providing the two dead time generators 4-1 and 4-2.

In the transformer TR1, winding directions of the primary winding and the secondary winding are selected such that the positive-negative direction of the voltage applied to the primary winding is the same as that of the voltage induced across the secondary winding (see "." shown in FIG. 5).

One of terminals of the primary winding in the transformer TR1 is connected to the node between the switching elements Q3 and Q4, whereas the other of the terminals of the primary winding in the transformer TR1 is connected to the node between the switching elements Q5 and Q6. The voltage resonance function is fulfilled by the internal capacitances of the switching elements Q3 to Q6 and inductance of the primary side in the transformer TR1.

The rectifier 20 is connected to the secondary winding of the transformer TR1 to conduct full-wave rectification on an AC voltage induced across the secondary winding. The rectifier 20 includes four diodes D3 to D6. The diodes D3 and D6 function when a forward (positive) voltage is induced across the secondary winding of the transformer TR1, whereas the diodes D4 and D5 function when a backward (negative) voltage is induced across the secondary winding of the transformer TR1. The diodes D3 and D4 are inserted in such a direction as to let a current flow from the secondary winding, whereas the diodes D5 and D6 are inserted in such a direction as to let a current flow into the secondary winding.

The current resonance capacitor C9 is connected between high and low output lines of the rectifier 20. In other words, the current resonance capacitor C9 is provided so as to constitute a current path including the secondary winding of the transformer TR1, the diode D3, the current resonance capacitor C9 and the diode D6, or a current path including the secondary winding of the transformer TR1, the diode D4, the current resonance capacitor C9 and the diode D5. The current resonance capacitor C9 fulfils the current resonance function in cooperation with leak inductance of the transformer TR1.

The smoothing filter 21 is, for example, a ladder circuit including a coil L1 and a capacitor C10. The smoothing filter 21 functions to smooth a rectified output of the rectifier 20, and supply the smoothed voltage to DC output terminals OUTP and OUTN.

Operation of the power conversion apparatus (DC-DC converter) 1A in the second embodiment will now be described with reference to a signal waveform shown in FIG. 6 in addition to FIG. 5.

For example, when the conversion operation of the power conversion apparatus 1A becomes necessary, the user orders the operation start by using a button or the like, which is not illustrated. As a result, the rectangular wave clock oscillator 3A outputs a rectangular wave clock S20 generated by oscillation as shown in FIG. 6A.

If a rectangular wave clock S20 is input, then each of the dead time generators 4-1 and 4-2 forms the other rectangular wave clock by inverting the rectangular wave clock S20, and prepares a pair of complementary rectangular wave clocks. Thereafter, each of the dead time generators 4-1 and 4-2 forms complementary on/off control signals having a dead time S21 and S22, and S23 and S24 (see FIGS. 6B to 6E), and supplies them to a pair of corresponding switching elements Q3 and Q4, and Q5 and Q6, respectively.

Over intervals over which the on/off control signals S21 and S24 order the on-state, the on/off control signals S22 and S23 order the off-state. At this time, a current path is formed from the DC input terminal INP to the DC input terminal INN via the switching element Q5, the primary winding of the transformer TR1 and the switching element Q4. A change in current I2 for excitation in the opposite direction as shown in FIG. 6G occurs in the primary winding of the transformer TR1.

Incidentally, in an interval (dead time interval) over which all on/off control signals S21 to S24 order the off-state, the current I2 does not flow through the primary winding of the transformer TR1. FIG. 6F shows a change of a voltage V2 applied to the primary winding of the transformer TR1.

During the above-described operation of the primary side in the transformer TR1, the voltage resonance function is fulfilled by internal capacitances of the switching elements Q3 to Q6 composed of MOS transistors and inductance on the primary side of the transformer TR1.

An AC voltage is induced across the secondary winding by a current change in the primary winding of the transformer TR1. Such an AC induced voltage is subjected to full-wave rectification in the rectifier 20, smoothed by the smoothing filter 21, and output from DC output terminals OUTP and OUTN. During the operation of the secondary side, the current resonance function is fulfilled by leak inductance of the transformer TR1 and the current resonance capacitor C9.

According to the second embodiment, two pairs of switching elements are used, but effects similar to those of the first embodiment can be brought about.

(C) Third Embodiment

FIG. 7 is a circuit diagram showing a general configuration of a third embodiment of a power conversion apparatus according to the present invention. The same components as or corresponding to those shown in FIG. 1 according to the first embodiment are denoted by like characters. Incidentally, the power conversion apparatus in the third embodiment is also DC in input and output. In other words, the power conversion apparatus is a DC-DC converter for converting a DC voltage to another DC voltage.

With reference to FIG. 7, the power conversion apparatus (DC-DC converter) 1B in the third embodiment includes a DC-DC conversion section 2B, a rectangular wave clock oscillator 3, and a dead time generator 4.

The rectangular wave clock oscillator 3 and the dead time generator 4 are the same as those in the first embodiment, and description thereof will be omitted.

In the third embodiment, the DC-DC conversion section 2B includes switching elements Q7 and Q8, a capacitor C11, a transformer TR2, and diodes D7 and D8.

In the transformer TR2, each of primary windings and secondary windings has a center tap. In the transformer TR2, winding directions of the primary winding and the secondary winding are selected such that the positive-negative direction of the voltage applied to the primary winding is the same as that of the voltage induced across the secondary winding (see "·" shown in FIG. 7).

The center tap of the primary winding in the transformer TR2 is connected to a DC input terminal INP of high potential side. A DC input terminal INN of low potential side is connected to one terminal of the primary winding in the transformer TR2 via the switching element Q7, and connected to the other terminal of the primary winding in the transformer TR2 via the switching element Q8.

The switching elements Q7 and Q8 are, for example, MOS transistors. The switching elements Q7 and Q8 conduct on/off operations in a complementary manner in response to corresponding on/off control signals (similar to those shown in FIGS. 4B and 4C) supplied from the dead time generator 3.

In the third embodiment as well, the voltage resonance function is fulfilled by the internal capacitances of the switching elements Q7 and Q8 and inductance of the primary side in the transformer TR2 (half inductance between the center tap and a terminal).

The center tap of the secondary winding in the transformer TR2 is connected to a DC output terminal OUTN of low potential side. A DC output terminal OUTP of high potential side is connected to both terminals of the secondary winding in the transformer TR2 via cathodes and anodes of the diodes D7 and D8, respectively. The smoothing capacitor C11 is connected between the output terminals OUTP and OUTN.

Operation of the power conversion apparatus 1B in the third embodiment can be analogized from the operation of the power conversion apparatus 1 in the first embodiment, and consequently description thereof will be omitted.

In the third embodiment as well, effects similar to those in the first embodiment can be brought about, except the effect obtained by the current resonance function.

(D) Fourth Embodiment

Figure 8:
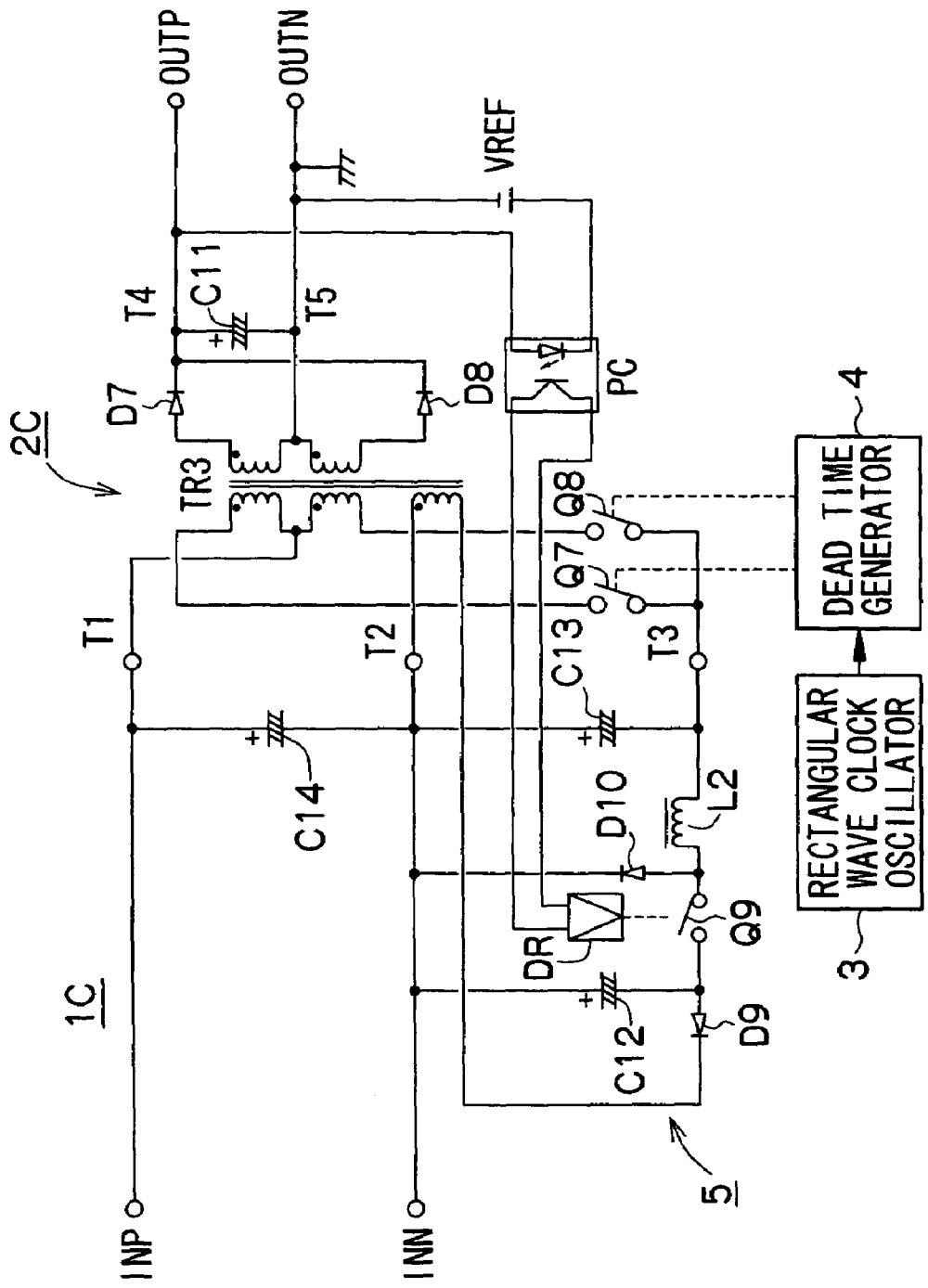
FIG. 8 is a circuit diagram showing a general configuration of a power conversion apparatus according to a fourth embodiment of the invention.

FIG. 8 is a circuit diagram showing a general configuration of a fourth embodiment of a power conversion apparatus according to the present invention. The same components as or corresponding to those shown in FIG. 7 according to the third embodiment are denoted by like characters. Incidentally, the power conversion apparatus in the fourth embodiment is also DC in input and output. In other words, the power conversion apparatus is a DC-DC converter for converting a DC voltage to another DC voltage.

With reference to FIG. 8, the power conversion apparatus (DC-DC converter) 1C in the fourth embodiment includes an output voltage stabilization circuit 5 besides a DC-DC conversion section 2C, a rectangular wave clock oscillator 3, and a dead time generator 4.

The rectangular wave clock oscillator 3 and the dead time generator 4 are the same as those in the first embodiment, and description thereof will be omitted.

In the fourth embodiment, the DC-DC conversion section 2C includes a capacitor C14 besides switching elements Q7 and Q8, a capacitor C11, a transformer TR3, and diodes D7 and D8.

The DC-DC conversion section 2C in the fourth embodiment differs from the DC-DC conversion section 2B in the third embodiment in that (1) the other terminals of the switching elements Q7 and Q8 connected across a primary winding of the transformer TR3 are connected not to the DC input terminal INN of the low potential side but to an output terminal T3 of the output voltage stabilization circuit 5, which is lower in potential than the DC input terminal INN (T2), (2) the primary side of the transformer TR3 has an auxiliary winding, (3) a voltage across the capacitor C11 is input to the output voltage stabilization circuit 5, and (4) the capacitor C14 is connected between the DC input terminals INP and INN in order to absorb the variation of the input DC voltage. Incidentally, the capacitor C14 can be omitted.

The output voltage stabilization circuit 5 includes diodes D9 and D10, capacitors C12 and C13, a switching element Q9, a driver DR, a coil L2, a photocoupler PC, and reference power supply VREF. The auxiliary winding of the transformer TR3 is a component of the output voltage stabilization circuit 5.

One terminal of the auxiliary winding in the transformer TR3 is connected to the DC input terminal of low potential side. The other terminal of the auxiliary winding is connected to the diode D9 at its cathode. In the transformer TR3, winding directions of the primary winding and the auxiliary winding are selected such that the positive-negative direction of the voltage applied to the primary winding is the same as that of the voltage induced across the auxiliary winding (see "·" shown in FIG. 8). A voltage is induced across the auxiliary winding of the transformer TR3 by a change in magnetic flux excited by a change in an alternating current through the primary winding.

The diode D9 functions to rectify the voltage induced across the auxiliary winding of the transformer TR3. The diode D9 is connected at its anode to one terminal of the capacitor C12. The other terminal of the capacitor C12 is connected to the DC input terminal INN. The capacitor C12 smoothes the rectified output.

One terminal of the switching element Q9 is connected to a node between the diode D9 and the capacitor C12. The other terminal of the switching element Q9 is connected to an output terminal T3 of the output voltage stabilization circuit 5 via the L2. The diode D10 is connected at its node to a node between the switching element Q9 and the coil L2, and connected at its cathode to the DC input terminal INN. The capacitor C13 is connected between the DC input terminal INN and the output terminal T3 of the output voltage stabilization circuit 5.

The switching element Q9 is turned on/off by the driver DR. The driver DR turns on/off the switching element Q9 according to an output signal of the photocoupler PC. One input terminal of the photocoupler PC is connected to a DC output terminal OUTP of high potential side. The other input terminal of the photocoupler PC is connected to a DC output terminal OUTN of low potential side via a reference power supply (for example, composed of a battery) VREF. If a voltage difference between the DC output and the reference power supply VREF has become at least a predetermined value, then the photocoupler PC turns on, and the driver DR supplied with an output signal of the photocoupler PC also turns on the switching element Q9.

The capacitor C13 basically forms a potential at the output terminal T3 of the output voltage stabilization circuit 5, which is lower than the potential at the DC input terminal INN.

When the switching element Q9 is in the on-state, a current path passing through the capacitor C13 and the coil L2 is formed by a voltage obtained by conducting rectification and smoothing using the diode D9 and the capacitor C12 on the voltage induced across the auxiliary winding of the transformer TR3. At this time, the coil L2 functions to store energy. When the switching element Q9 is in the off-state, the coil L2 functions to emit the stored energy. A current generated by emission of energy from the coil L2 flows via the diode D10 so as to charge the capacitor C13. The diode D10 functions in this way.

Operation of a power conversion apparatus (DC-DC converter) IC in the fourth embodiment will now be described.

One terminal of each of the switching elements Q7 and Q8 is connected not to the DC input terminal INN of low potential side, but to the output terminal T3 of the output voltage stabilization circuit 5, which is lower in potential than the DC input terminal INN. However, the fourth embodiment is the same as the embodiments described above in that the switching elements Q7 and Q8 are subjected to on/off control using complementary on/off control signals having a dead time supplied from the dead time generator 4 and a DC output is formed. Description thereof will be omitted.

Hereafter, the function and operation of the output voltage stabilization circuit 5 will be described. FIG. 9 is a signal waveform diagram showing an operation concept of the output voltage stabilization circuit 5.

It is now supposed that the input DC voltage between terminals T1 (INP) and T2 (INN) varies as shown in FIG. 9A. In order to stabilize a DC output voltage between terminals T4 (OUTP) and T5 (OUTN) so as to bring the same to a target voltage as shown in FIG. 9B even if there is such a variation in the DC input voltage, the output voltage stabilization circuit 5 is provided. FIG. 9A shows an example in which the DC input terminal of high potential side INP (T1) has a potential of 160 V and the DC input terminal of low potential side INN (T2) has a potential of 0 V. FIG. 9B shows an example in which the DC output voltage is 10 V.

FIG. 10 is a diagram showing a current path including the capacitor C13, which prescribes the potential at the output terminal T3, and FIG. 10 shows a part of FIG. 8. As shown in FIG. 10, the chopper circuit technique has been applied to the principal part of the output voltage stabilization circuit 5.

When the output side is stable and the switching element Q9 is in the on-state, a charging current iON is let flow to the capacitor C13 by a voltage obtained by conducting rectification and smoothing using the diode D9 and the capacitor C12 on a voltage induced across the auxiliary winding LTR of the transformer 3. In addition, energy is stored in the coil L2. Because of a voltage (charging voltage) formed across the capacitor C13 by the charging operation, the potential at the terminal T3 becomes lower than the potential at the terminal T2 by the charging potential.

If the input DC voltage varies as shown in FIG. 9A, then the voltage between the terminals T2 and T3 is also varied in the same way as shown in FIG. 9C by the function of the capacitors C14 and C13. As a result, the voltage between the terminals T1 and T3, which is the voltage applied to the primary winding of the transformer TR3, becomes constant when the terminal T3 is regarded as the common potential. When the maximum voltage which can be taken is −Vmax (for example, −40 V), its middle point potential −Vmax/2 becomes a rate voltage for the voltage between the terminals T2 and T3. In the case of FIG. 9, the voltage applied to the primary winding of the transformer TR3 becomes stable at 160 V.

As described above, the voltage applied to the primary winding of the transformer TR3 is stable irrespective of the variation in the input DC voltage. Therefore, the output DC voltage between the terminals T4 (OUTP) and T5 (OUTN) can be stabilized to the target voltage as shown in FIG. 9B.

If such a pulsating current as to exceed the reference power supply VREF occurs in the output DC voltage even if rectification and smoothing are conducted on the voltage induced across the secondary winding of the transformer TR3, then the photocoupler PC turns on, consequently the transistor Q9 turns off. If the switching element Q9 is turned off, then a current iOFF, which is generated by energy stored across the coil L2 when the switching element Q9 is in the on-state, flows to the capacitor C13 via the diode D10 as the charging current. However, a charging current generated by a voltage obtained by rectifying and smoothing the induced voltage on the auxiliary winding LTR of the transformer TR3 does not flow. The voltage applied to the primary winding of the transformer TR3 is reduced. As a result, the pulsating voltage on the output side can be canceled, and the output DC voltage between the terminals T4 (OUTP) and T5 (OUTN) can be stabilized.

In the fourth embodiment as well, effects similar to those in the third embodiment can be brought about. In addition, the DC output can be further stabilized by the function of the output voltage stabilization circuit 5.

(E) Fifth Embodiment

Figure 11:
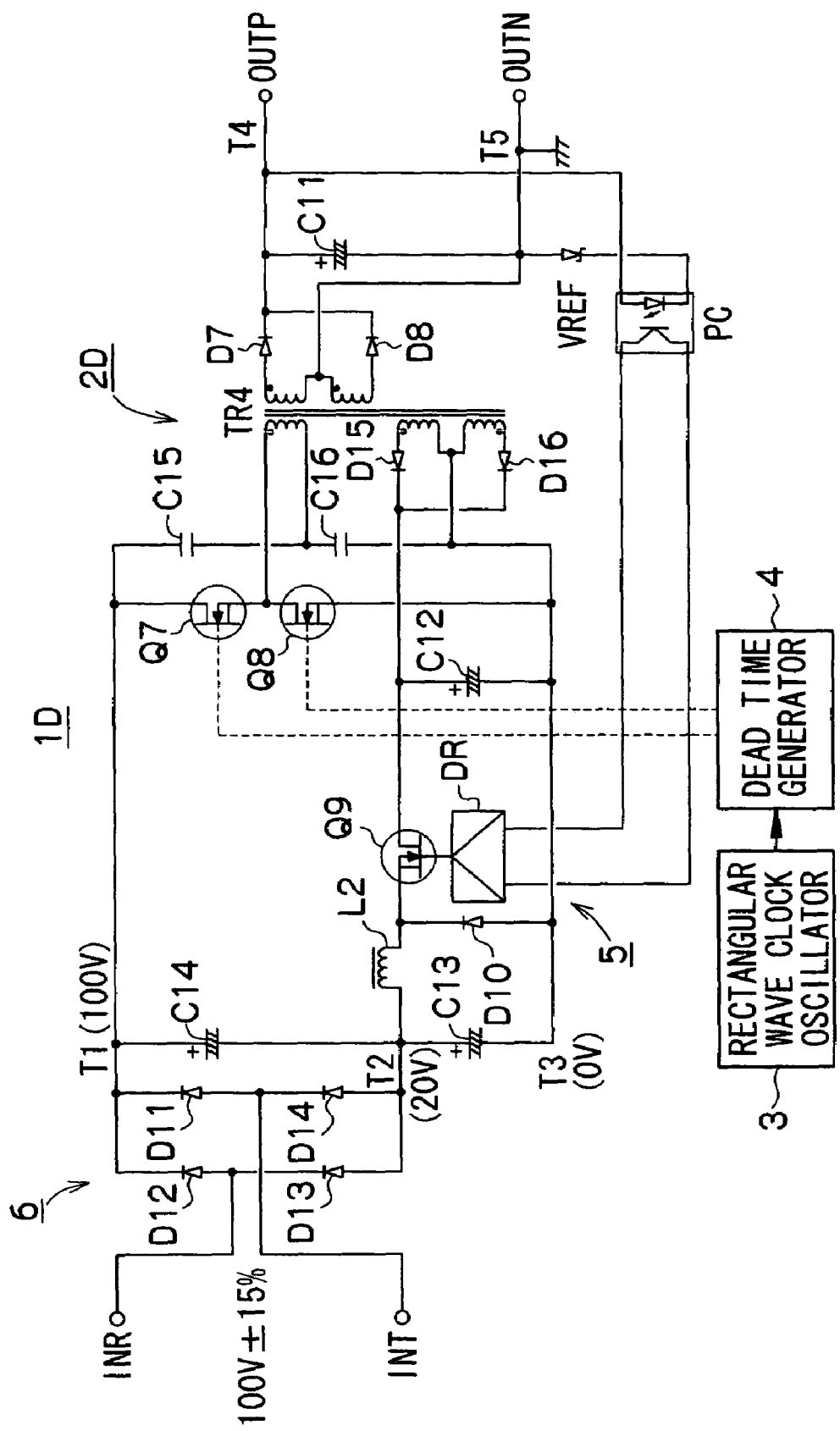
FIG. 11 is a circuit diagram showing a general configuration of a power conversion apparatus according to a fifth embodiment of the invention.

FIG. 11 is a circuit diagram showing a general configuration of a fifth embodiment of a power conversion apparatus according to the present invention. The same components as or corresponding to those shown in FIG. 8 according to the fourth embodiment are denoted by like characters. Incidentally, the power conversion apparatus in the fifth embodiment is AC in input and DC in output. In other words, the power conversion apparatus is an AC-DC converter for converting an AC voltage to a DC voltage.

With reference to FIG. 11, the power conversion apparatus (AC-DC converter) 1D in the fifth embodiment includes an AC-DC conversion section 6 besides a DC-DC conversion section 2D, a rectangular wave clock oscillator 3, a dead time generator 4, and an output voltage stabilization circuit 5.

The AC-DC conversion section 6 is provided at an input stage of the power conversion apparatus (AC-DC converter) ID in the fifth embodiment. The AC-DC conversion section 6 includes four diodes D11 to D14 forming a full-wave rectifier circuit. The capacitor C14 can be regarded as a component in the AC-DC conversion section 6.

An AC input voltage (for example, 100 V±15%), which is input between a pair of AC input terminals INR and INT, is subjected to full-wave rectification using the diodes D11 to D14, and then smoothed by the capacitor C14, resulting in a DC voltage.

A configuration for converting a DC voltage thus obtained to another DC voltage is nearly the same as that in the fourth embodiment. Hereafter, only different points will be described.

A transformer TR4 in the DC-DC conversion section 2D according to the fifth embodiment includes a primary winding that does not have a center tap. Its auxiliary winding has a center tap.

Since the auxiliary winding has the center tap, two diodes D15 and D16 are provided to rectify its AC induced voltage.

In the case of the fifth embodiment, a low potential (potential at the terminal T3) prescribed by the output voltage stabilization circuit 5 is set equal to 0 V, and high and low potentials (potentials at the terminals T1 and T2) in the output of the AC-DC conversion section 6 are set equal to 160 V and 20 V, respectively.

The switching elements Q7 and Q8, which conduct complementary on/off operations, are connected in series between the terminals T1 and T3. The node between the switching elements Q7 and Q8 is connected to one terminal of the primary winding in the transformer TR4. The other terminal of the primary winding in the transformer TR4 is connected to the terminal T1 via a capacitor C15, and connected to the terminal T3 via a capacitor C16. The capacitors C15 and C16 fulfil the current resonance function in cooperation with the primary winding of the transformer TR4.

The feasible configuration of the reference voltage VREF has been changed from a battery to a Zener diode. However, this is not an essential change.

Although the connection and configuration in the output voltage stabilization circuit 5 are somewhat different from those in the fourth embodiment, the operation and function are the same as those in the fourth embodiment.

In other words, the fifth embodiment differs from the fourth embodiment in that the AC-DC conversion section 6 is provided at the input stage and a current resonance configuration is provided which includes the capacitors C15 and C16 and the primary winding of the transformer TR4. Except them, the fifth embodiment is the same as the fourth embodiment.

In the fifth embodiment as well, effects similar to those of the fourth embodiment can be brought about. In addition, the fifth embodiment can cope with an AC input. Furthermore, the fifth embodiment brings about an effect that the DC output can be further stabilized by the current resonance configuration.

(F) Other Embodiments

The technical concepts of the present invention are not restricted to the configurations of the first to fifth embodiments, but the following modified embodiments can be mentioned.

The specific configuration of the dead time generator according to the present invention is not limited to that shown in FIG. 2. In other words, the specific configuration of the integrator circuits 10 and 12 serving as the triangular wave forming circuits may be a different configuration so long as a triangular wave signal can be formed with the same inclination in the monotonous increase and the monotonous decrease as shown in FIGS. 3B and 3D. Furthermore, the specific configuration of the comparator circuits 11 and 13 is not restricted to a configuration using an inverter. If a circuit that outputs a part of a triangular wave signal higher than a reference voltage as an L level is used as the comparator circuit at the final stage, then the inverter INV5 at the final stage can be omitted. In this case, the comparator circuit at the final stage fulfils the inverter function at the final stage as well, and it is equivalent to the configuration having the inverter at the final stage.

The configuration having the current resonance function on the secondary side of the transformer as in the second embodiment may also be applied to the configuration in the third or fourth embodiment.

The technical concept of detecting a variation in DC output and feeding back the same as in the fourth and fifth embodiments may also be applied to the configuration in the first or second embodiment.

In the fourth and fifth embodiments, the low potential side to the primary winding of the transformer is controlled according to the variation of the DC output. However, the low potential side to the primary winding of the transformer may be controlled according to the variation of the DC output.

In the fourth embodiment, the photocoupler is inserted in the path for detecting and feeding back a variation in DC output, and electric insulation between the primary side and the secondary side of the transformer is ensured thereby. Alternatively, other coupling means (such as a transformer) capable of ensuring electrical insulation may be used instead of the photocoupler.

In the foregoing description, the power conversion apparatus includes a plurality of synchronously operated DC-DC conversion sections and the DC-DC conversion sections share the rectangular wave clock oscillator. However, the dead time generator may also be shared by the DC-DC conversion sections.

What is claimed is:

1. A dead time generator for forming complementary on/off control signals having a dead time to be supplied to paired switching elements, comprising:

first triangular wave forming means for converting a first rectangular wave signal having a duty ratio of 50% input thereto to a first triangular wave forming signal having the same inclination in monotonous increase and monotonous decrease;

first comparator means for forming a second rectangular wave signal having a duty ratio of 50% shifted in phase from the first rectangular wave signal by $\pi/2$ (or $-\pi/2$) by comparing the first triangular wave signal with a first threshold level;

second triangular wave forming means for converting the second rectangular wave signal to a second triangular wave forming signal having the same inclination in monotonous increase and monotonous decrease;

second comparator means for forming a third rectangular wave signal having a duty ratio greater than 50% by a value corresponding to the dead time, shifted in phase from the second rectangular wave signal by $\pi/2$ (or $-\pi/2$) by comparing the second triangular wave signal with a second threshold level; and inverter means for inverting and outputting the third rectangular wave signal, and thereby outputting an on/off control signal having the same phase as that of the first rectangular wave signal and having a dead time interval.

2. A power conversion apparatus comprising: switching means having one or more pairs of switching elements;

a transformer in which a current flowing through a primary winding thereof is alternated by turning on and off of the switching elements in the switching means;

rectifier means for rectifying a voltage induced across a secondary winding of the transformer;

smoothing means for smoothing a rectified output of the rectifier means;

rectangular wave oscillator means for generating a rectangular wave signal having a duty ratio of 50% by oscillation;

a dead time generator for forming complementary on/off control signals having a dead time to be supplied to paired two switching elements, on the basis of the rectangular wave signal output from the rectangular wave oscillator means; and output stabilization means for detecting an output voltage variation of the smoothing means and adjusting a voltage applied to the primary winding of the transformer, the output stabilization means being configured for conducting level shifting on a DC voltage input outside or a DC voltage obtained by converting an AC voltage input outside in AC-DC conversion means, and applying a resulting DC voltage to the primary winding of the transformer, and wherein quantity of the level shift is adjusted on the basis of a voltage induced across an auxiliary winding of the transformer, and on the basis of a result obtained by detecting an output voltage variation of the smoothing means.

3. The power conversion apparatus according to claim 2, wherein an input DC voltage supplied outside is input to the switching means directly or after being shifted in level.

4. The power conversion apparatus according to claim 2, further comprising AC-DC conversion means for converting an input AC voltage supplied outside to a DC voltage, wherein a DC voltage output from the AC-DC conversion means is input to the switching means directly or after being shifted in level.

5. The power conversion apparatus according to claim 2, further comprising current resonance means having the primary winding of the transformer on a primary side of the transformer.

6. The power conversion apparatus according to claim 2, further comprising current resonance means on a secondary side of the transformer.

7. The power conversion apparatus according to claim 2 wherein the switching elements comprise MOS transistors, and the internal capacitance of the switching elements and the primary winding of the transformer fulfill a voltage resonance function.

8. A power conversion apparatus comprising:
switching means having one or more pairs of switching elements;
a transformer in which a current flowing through a primary winding thereof is alternated by turning on and off of the switching elements in the switching means;
rectifier means for rectifying a voltage induced across a secondary winding of the transformer;
smoothing means for smoothing a rectified output of the rectifier means;
rectangular wave oscillator means for generating a rectangular wave signal having a duty ratio of 50% by oscillation; and
a dead time generator for forming complementary on/off control signals having a dead time to be supplied to paired two switching elements, on the basis of the rectangular wave signal output from the rectangular wave oscillator means, said dead time generator comprising:
first triangular wave forming means for converting a first rectangular wave signal having a duty ratio of 50% input thereto to a first triangular wave forming signal having the same inclination in monotonous increase and monotonous decrease;
first comparator means for forming a second rectangular wave signal having a duty ratio of 50% shifted in phase from the first rectangular wave signal by $\pi/2$ (or $-\pi/2$) by comparing the first triangular wave signal with a first threshold level;
second triangular wave forming means for converting the second rectangular wave signal to a second triangular wave forming signal having the same inclination in monotonous increase and monotonous decrease;
second comparator means for forming a third rectangular wave signal having a duty ratio greater than 50% by a value corresponding to the dead time, shifted in phase from the second rectangular wave signal by $\pi/2$ (or $-\pi/2$) by comparing the second triangular wave signal with a second threshold level; and
inverter means for inverting and outputting the third rectangular wave signal, and thereby outputting an on/off control signal having the same phase as that of the first rectangular wave signal and having a dead time interval.

9. The power conversion apparatus according to claim 8, further comprising a plurality of sets, each of the sets comprising the switching means, the transformer, the rectifier means, the smoothing means and the dead time generator,
wherein the rectangular wave oscillator means is shared by the sets.

10. The power conversion apparatus according to claim 8, wherein an input DC voltage supplied outside is input to the switching means directly or after being shifted in level.

11. The power conversion apparatus according to claim 8, further comprising AC-DC conversion means for converting an input AC voltage supplied outside to a DC voltage, wherein a DC voltage output from the AC-DC conversion means is input to the switching means directly or after being shifted in level.

12. The power conversion apparatus according to claim 8, further comprising current resonance means having the primary winding of the transformer on a primary side of the transformer.

13. The power conversion apparatus according to claim 8, further comprising current resonance means on a secondary side of the transformer.

14. The power conversion apparatus according to claim 8, wherein
the switching elements comprise MOS transistors, and the internal capacitance of the switching elements and the primary winding of the transformer fulfill a voltage resonance function.

* * * * *